H. Y. ARMSTRONG.
WRAPPING MACHINE.
APPLICATION FILED OCT. 14, 1915.

1,308,321.

Patented July 1, 1919.
5 SHEETS—SHEET 5.

Witnesses
J H McCready
S P Marsh

Inventor
Harry Y. Armstrong
By his attorneys
Putnam Putnam & Bell

UNITED STATES PATENT OFFICE.

HARRY Y. ARMSTRONG, OF SPRINGFIELD, MASSACHUSETTS, ASSIGNOR TO PACKAGE MACHINERY COMPANY, OF SPRINGFIELD, MASSACHUSETTS, A CORPORATION OF MASSACHUSETTS.

WRAPPING-MACHINE.

1,308,321.　　　　　Specification of Letters Patent.　　Patented July 1, 1919.

Application filed October 14, 1915. Serial No. 55,908.

*To all whom it may concern:*

Be it known that I, HARRY Y. ARMSTRONG, a citizen of the United States, residing at Springfield, in the county of Hampden and State of Massachusetts, have invented certain Improvements in Wrapping-Machines, of which the following description, in connection with the accompanying drawings, is a specification, like reference characters on the drawings indicating like parts in the several figures.

It is a common practice in wrapping articles of various kinds to inclose an insert of some character, such for instance as a card, coupon or folder, in the package with each article. Sometimes this insert performs an important function in the packaging of the articles, serving, for instance, to stiffen the package and make it hold its shape, while in other cases it merely forms a part of some selling scheme or is used for advertising purposes. The present invention relates particularly to machines for performing packaging operations of this character and is directed especially to the provision of a simple and thoroughly reliable mechanism for introducing inserts of the general character mentioned into the packages. The invention also aims to devise an efficient and thoroughly practical wrapping mechanism which may be used either with or without some mechanism for introducing inserts into the packages which it forms.
The various features of the invention will be readily understood from the following description, reference being made to the accompanying drawings, in which—

Figure 1 is a plan view of a machine embodying the present invention;

Fig. 2 is a vertical, sectional view on the line 2—2, Fig. 3;

The specific machine shown has the same general organization and includes much of the mechanism of the machine shown in my co-pending application Serial No. 833,157, filed April 20, 1914, and is designed to be used in conjunction with the machine shown in my application Serial No. 54,646, filed October 7, 1915. It should be understood, however, that the invention is not limited to the embodiment shown or to use with any particular product or with any other specific machine but this form of the invention has been shown for the purpose of explaining the invention as embodied in a successful machine.

The machine shown and described in the later application above designated was designed especially to wrap plugs of tobacco in a tin foil wrapper and then to fold around the wrapped package a label and a revenue stamp. The machine shown in the accompanying drawings takes the package from the machine just described and incloses the package in an outside wrapper, preferably of glassen, paraffined or some similar paper after first associating a coupon with the package so that it also will be inclosed in the outside wrapper.

Figures 1, 2:
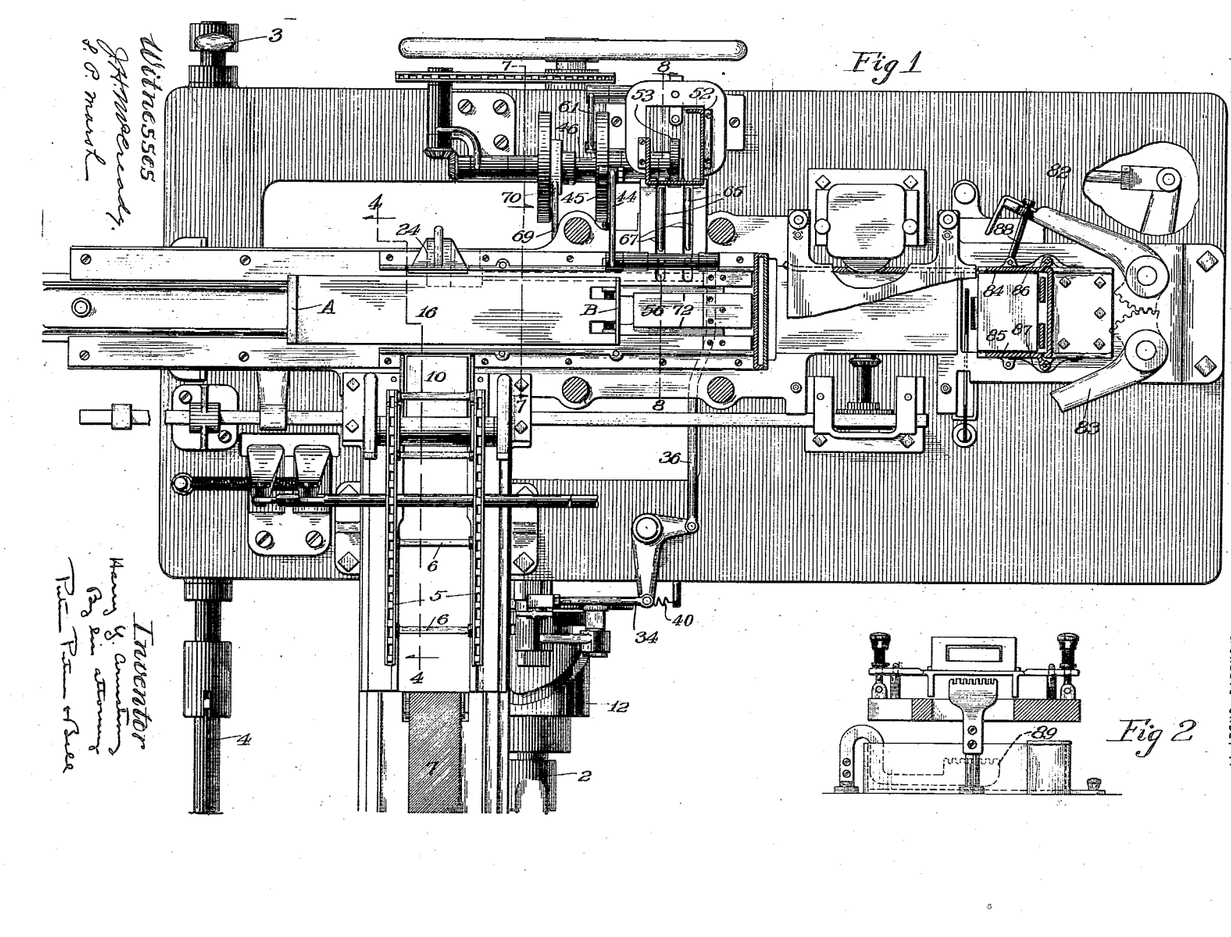
Figure 3:
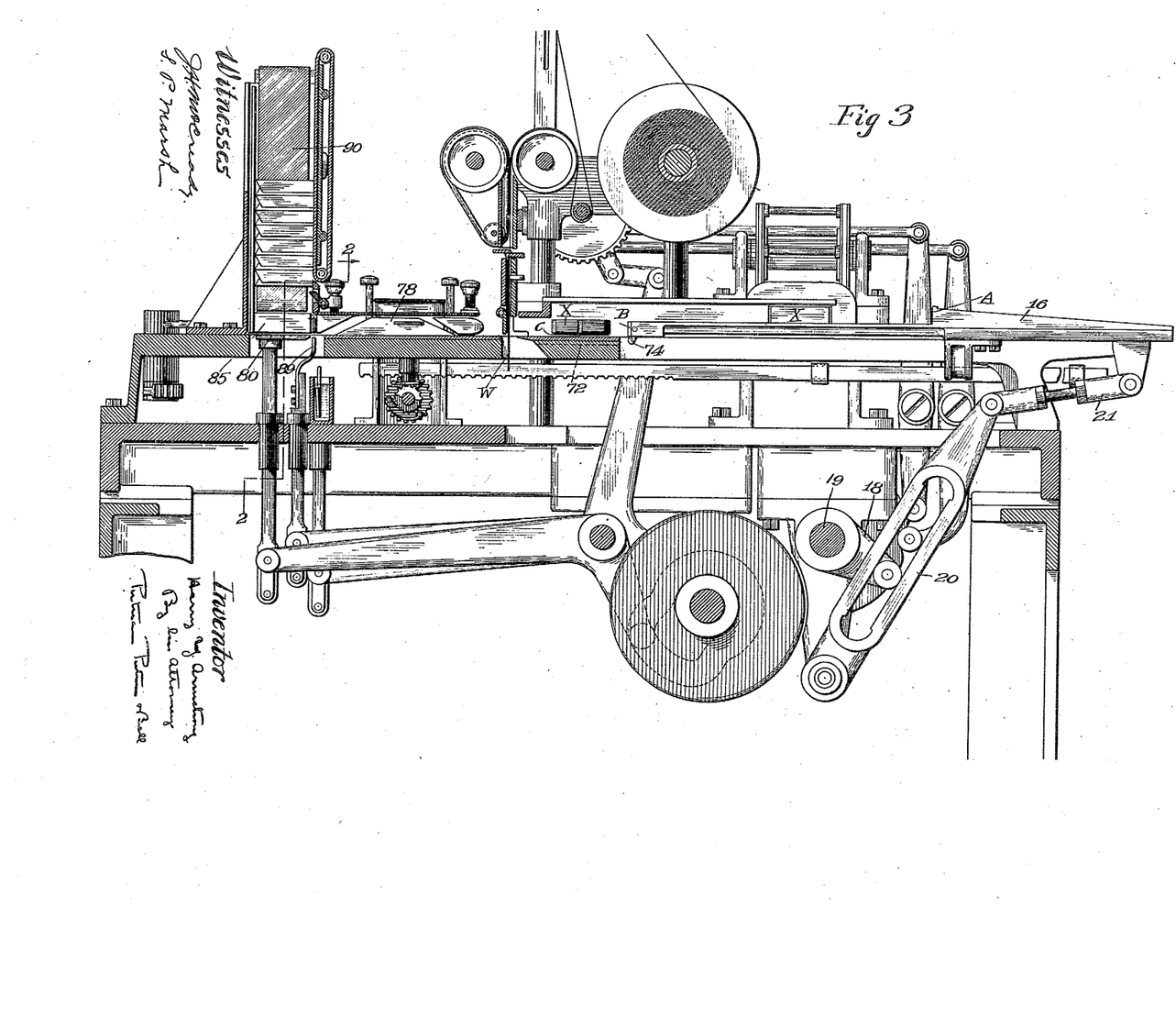
Fig. 3 is a longitudinal, vertical, sectional view through the machine shown in Fig. 1, the plane on which the section is taken lying substantially in the path of travel of the packages through the wrapping mechanism of the machine.
Figures 4, 5, 6:
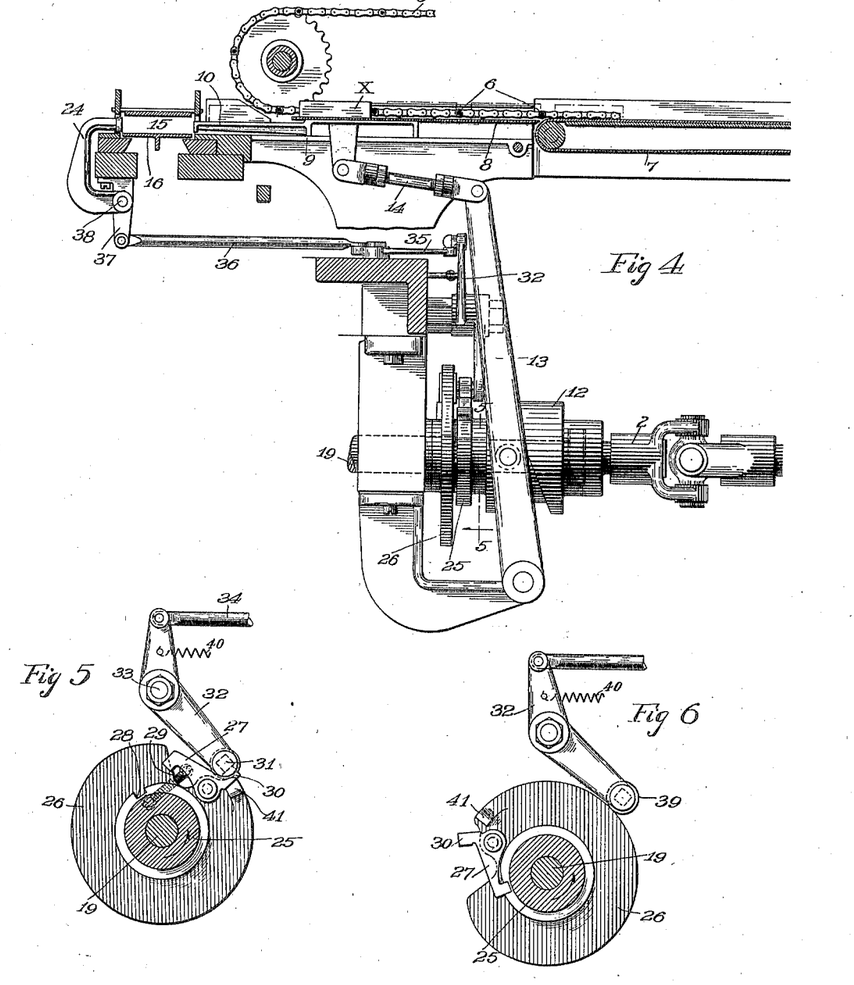
Fig. 4 is a vertical, sectional view showing certain details of construction of the article feeding mechanism and taken substantially on the line 4—4, Fig. 1.
Figs. 5 and 6 are vertical, sectional views taken on the line 5—5, Fig. 4;

In the specific arrangement shown, power is applied to the machine through a driving shaft 2 extending from the companion machine, the power to both machines being under the control of one or more hand levers 3 (see Fig. 1) arranged to operate a shipper shaft 4 which connects or disconnects the machine from its source of power. The articles to be wrapped are brought to the machine by means of a conveyer comprising a pair of chains 5 supported on suitable sprocket wheels, the articles lying between the chains and being advanced by a series of pusher bars or rods 6 that connect the two chains. These bars are so spaced apart as to afford between them a sufficient space for the introduction of an article to be wrapped, which in the present instance consists of a package of tobacco. As the articles X (see Fig. 4) are carried to the machine they are supported on a conveyer belt 7 until they reach the machine frame when they are moved on to a horizontal support or platform 8. Each pusher 6 forces the package in front of it off the end of this platform 8, thus causing the package to drop on to the surface of a lower support or platform 9 out of the range of movement of the pushers 6 and in front of a plunger 10 which lies immediately under the platform 8 and is reciprocated in a direction parallel to the direction of travel of the chains 5. A cam 12, fast on the shaft 2, operates through a lever 13 and a link 14 that connects the upper end of the lever with the plunger 10 to give this plunger its operative movement. The parts, of course, are so timed that each package X is delivered to the support 9 in front of the plunger 10 while the plunger is at the rearward part of its stroke and the plunger then immediately moves forward carrying the package just delivered to it into a guideway 15 and on to the surface of another plunger 16, movable through said guideway in a horizontal plane and in a direction at right angles to the direction of movement of the plunger 10.
The plunger 16 is given a reciprocating movement by means of a crank 18 fast on the shaft 19, Fig. 3, which is driven from the shaft 2 by gears (not shown) and this crank carries a roll that runs in a slot in the lever 20 which is connected by a link 21 with the plunger. This plunger has two plunger faces A and B, respectively, the face B being positioned in front of and at a lower level than the face A and the two faces are so spaced with reference to the stroke of the plunger that the rear face A is operative to advance a package to a point in front of the rearward limit of movement of the front face B. The plunger 10 operates to present the articles to be wrapped one at a time on to the plunger 16 in advance of its rear face A so that this face will be effective upon its next forward stroke to carry forward the article last presented to it where the article later will be positioned in front of the face B to be carried by this plunger face into the wrapping mechanism.
When the plunger 10 forces a package or article into the guideway 15 it pushes the article against the end of a finger 24 that normally projects into the guideway 15 and constitutes one element of a mechanism by which the operation of the machine is controlled. It obviously is desirable to prevent the feeding of a coupon or a wrapper whenever there is no article presented to the machine in position to receive the coupon or to be inclosed in the wrapper and the mechanism just mentioned is provided to effect this result. The present machine is rendered ineffective to perform the wrapping operation by stopping the entire machine whenever an article is not presented to the plunger 16 although the same result could be produced by stopping merely the paper feed and coupon feed. This controlling mechanism comprises a collar 25 which is fast on and rotates with the shaft 2 but encircles and rotates on the main shaft 19 of the machine, as shown in Figs. 4 and 6. The latter shaft has fixed thereto a wide collar 26 that has pivoted to one side thereof a pawl or dog 27 having an end shaped to enter a notch 28 formed in the collar 25. A spring 29 acts on this dog to hold it in contact with said collar 25 and tends to cause it to enter the notch 28. This dog has a tail portion 30 which is arranged to strike a squared pin 31 projecting laterally from the end of a lever 32 fulcrumed on the machine frame at 33 and connected by means of a link 34, a bell crank lever 35 and a rod or link 36 to an arm 37 projecting from the rock shaft 38 on which the finger 24 is fixed. A spring 40 acts on this lever system to swing the upper end of the finger 24 into the guideway 15. A roll 39, journaled on a portion of the pin 31 that projects from the opposite side of the lever arm 32, normally runs on the periphery of the collar 26 and holds the part 24 out of the guideway 15 at certain times.

It will be evident from an inspection of Figs. 1, 4, 5 and 6 that when an article to be wrapped is forced against the upper end of the finger 24 it will swing this member about the axis of the rock shaft 38 and that this motion will be transmitted through the parts 36, 35 and 34 to the lever 32, thus moving the pin 31 out of the path of the tail 30 of the dog 27. The spring 29, therefore, will be effective at this time to hold the end of the dog 27 in the notch 28, as shown in Fig. 6, thus causing the shafts 19 and 2 to rotate together. Since the other parts of the machine are all driven from the shaft 19, the entire operating mechanism of the machine will be driven at this time. Whenever no package is pushed into the guideway by the plunger 10, the end of the finger 24 will be projected into the guideway 15 by the spring 40 and consequently the pin 31 on the lever 32 at this time will be positioned in the path of the part 30 of the dog 27 and will tip this dog about its pivot until it has swung it out of the notch 28 in the driving member 25 and thus interrupted the driving connection between the shafts 2 and 19. The pin 31 tips the part 30 of the dog 27 against a lug 41 on the collar 26 and stops any further rotative movement of this collar and the shaft 19 which is fastened to it, the thrust of these parts being taken by the stationary pivot 33 of the lever 32. It will be noted that the periphery of the collar 26 is cut away in the neighborhood of the dog 27 to permit the pin 31 to drop inwardly toward the dog to perform the operation just described. When the dog has once passed the pin 31 without engaging it, the roll 39, running on the periphery of the collar 26, operates through the connections with the finger 24 to hold this device out of the path of the package. Usually an article is delivered to the plunger 10 at each stroke thereof so that this article merely presses against the finger and prevents it from coming forward while the dog 27 is passing the pin 31. Once this point has been passed the machine then completes one cycle of operations irrespective of the position of the finger.

Figure 7:
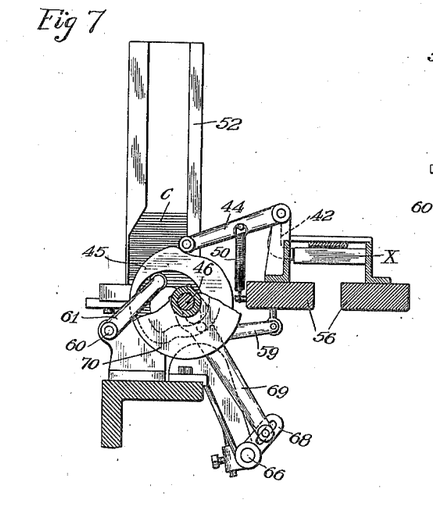
Figs. 7 and 8 are vertical sectional views of parts of the insert feeding mechanism taken respectively on the lines 7—7 and 8—8, Fig. 1.
Figure 8:
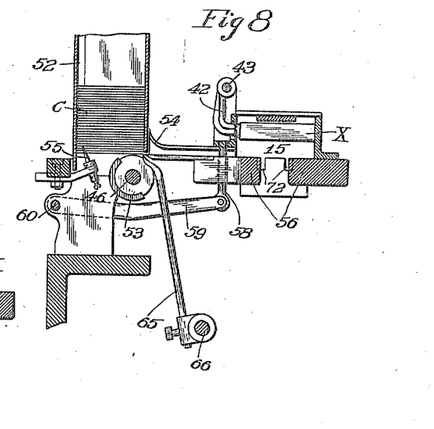

Assuming now that the rear face A of the plunger 16 has just advanced an article to the forward limit of its stroke, this article is caught and held against movement while the plunger makes its return stroke. This result is effected by means of a presser arm 42 (see Figs. 7 and 8) fast on a rock shaft 43 to which is fixed another arm 44 which carries a roll that runs on the periphery of a cam 45 driven by connections with the shaft 19. A spring 50 acts on the arm 44 in a direction tending to swing the presser member 42 into the guideway 15, thus causing this member to bear against one side of the package X which has just been moved forward by the plunger face A and to press this package against one wall of the guideway 15, as shown in Fig. 8. The operating parts for this presser device 42 are so designed that the device is caused to hold the package X in the position in which it is shown in Fig. 8 until the plunger 16 has completed its rearward stroke, at which time the part 42 is moved outwardly by the cam 45, thus releasing the package X and permitting it to drop in front of the front face B of the plunger 16.

While the package X is sustained in its forward position by the mechanism just described, an insert consisting in the present case of a coupon is introduced into the guideway 15 under the package. The coupon handling mechanism comprises a magazine 52 adapted to contain a stack of coupons C and a stripper roll 53, mounted on the shaft 46 at the bottom of the magazine, which is operative at each revolution of said shaft to feed the bottommost coupon in the stack out of the magazine and into a short horizontal guideway 54 that leads from the bottom of the magazine to the package guideway 15. A needle 55 projects into the rear ends of the coupons at the bottom of the magazine and prevents the stripper roll 53 from feeding more than one coupon at a time. The bottom of the coupon guideway 54 lies flush with the top of the support 56 that forms the bottom of the guideway 15 along which the articles are advanced to the wrapping mechanism by means of the plunger 16. The stripper roll 53 of course is operative to advance the bottommost coupon in the stack merely to a point just in front of the bottom of the magazine. The coupon so advanced may be skewed in the guideway and it is alined or squared up by coming in contact with two pins 58 that project vertically into the guideway 54 near opposite sides and at the forward end thereof and are mounted on the forward end of an arm 59 secured to a rock shaft 60 to which also is secured an arm 61 (see Fig. 7) carrying a roll that runs in a cam path formed in the cam 45. This cam is operative to raise the pins into the path of the coupon, as it is fed forward by the stripper roll 53 into contact with the pins, and to depress the pins again after they have squared up the coupon to permit it to be advanced into the package guideway 15.

This second coupon advancing movement is effected by means of a pair of arms 65 which are secured to a rock shaft 66 positioned below the guideway 54 and extending upwardly into slots 67 formed through the floor of the guideway 54. A short arm 68 fast on the rock shaft 66 is slotted to receive a roll mounted on one end of a cam follower 69 that is operated by a cam 70 on the shaft 46. As clearly shown in Fig. 8, the upper ends of the two arms 65 when in their rearward positions lie just below the opening at the bottom of the magazine 52 through which the coupons C are advanced. Consequently they lie just behind the rearmost edge of each coupon when it is in the position to which it is moved by the stripper 53. Immediately after the stripper has advanced a coupon and it has been squared up by the pins 58, the two arms 65 are swung forward and upwardly through the slots 67 by the operating mechanism just described and they thus push the coupon last fed out of the magazine through the guideway 54 and on to the support 56 immediately under the package X which is being sustained above the support 56 by the presser device 42 above described. The two pusher arms 65 are immediately returned to the positions in which they are shown in Fig. 8 in readiness to advance the next succeeding coupon.

Figure 9:
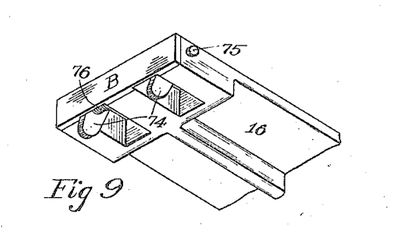
Fig. 9 is a perspective view showing certain details of the package advancing plunger.
Figure 10:
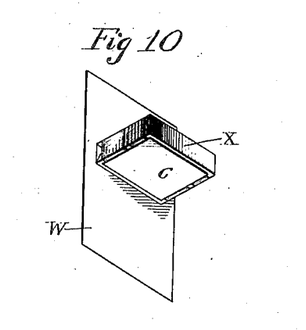
Figs. 10 to 16, inclusive, are perspective views showing the successive steps in the wrapping operations.
Figure 11:
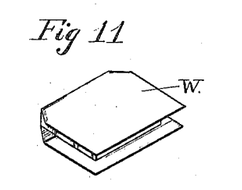
Figure 12:
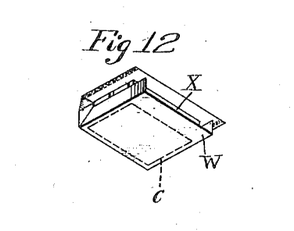

Immediately after the coupon has been introduced into the guideway 15, the arm 42 is operated to release the package X as above described, and this package then is deposited by gravity on to the coupon just advanced. Both the coupon and the package are now positioned as shown in Fig. 3 in front of the plunger face B which at this time is at the rearward part of its stroke. The plunger 16 is now advanced to carry the package X and the coupon C together into the wrapping mechanism. In order to insure the travel of the coupon with the package the support 56 is slotted longitudinally as indicated at 72 (see Figs. 1, 3 and 8) and the plunger is provided near the face B with two depending fingers 74 that extend into the slots 72. These fingers both swing on a pivot 75 (see Fig. 9) and are normally held in their depending positions by means of springs one of which is indicated at 76, Fig. 9, but which permit the fingers to swing upwardly and rearwardly into slots formed in the bottom of the plunger when the fingers arrive at the ends of the slots 72. As the plunger 16 is advanced its forward face B will push the package X in front of it while the depending fingers 74, entering the slots 72, will advance the coupon C which lies under the package. This movement will carry the article and coupon together into contact with the wrapper W, which is positioned across their path of movement by suitable wrapper feeding mechanism, and into and through a folding chute 78 which will fold the wrapper W about the package X, performing these operations substantially as indicated in Figs. 10, 11, 12 and 13.

Figure 13:
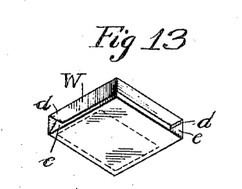
Figure 14:
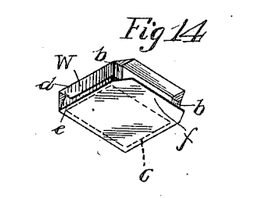
Figure 15:
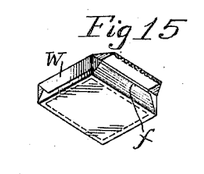

When the package arrives at the end of the folding chute 78 it is in the condition in which it is shown in Fig. 13, the wrapper covering up all the faces of the package except that against which the plunger face B is bearing. It will be noted that the wrapper is folded about the package in what often is termed a "die fold", the marginal edges of the wrapper being overlapped on each other at opposite edges of the package as indicated at $d$ and $e$ in Fig. 13. The plunger 16 deposits this package on the elevator 80 and tuckers 82 and 83 (see Fig. 1) immediately advance to make the end tucks, indicated in Fig. 14 at $b$, in the extensions of the overlapped parts of the wrapper. The forward end plates of the tuckers 82 and 83 make the end tucks $b$ by swinging inwardly toward each other over the end face of the package. As soon as these tuckers start toward each other they permit two clamping plates 84 and 85, respectively, to move against the opposite sides of the package where they clamp in place the folds $d$ and $e$. Two leaf springs 86 and 87 act respectively on the plates 84 and 85 to press them against the package. The plate 84 has pivoted to it a rod 88 that passes through a slot in the tucker arm 82 and has a head arranged to bear on the outer face of said arm when it is near the outward limit of its swinging movement; and the plate 85 is similarly connected to the tucker arm 83. Consequently when these arms swing away from each other and away from the package their connections with the two plates 84 and 85 operate to swing the plates also away from the package and release their pressure on the side folds. This operation does not take place, however, until after a bottom folder 89 has turned the lower flap $f$ from the position in which it is shown in Fig. 14 into its folding position in which it is shown in Fig. 15. In folding a wrapper about a package in the manner here shown it sometimes happens that in making the end tucks, which in this instance are made by the tuckers 82 and 83, they will open the side folds $d$ and $e$ and loosen the wrapper. This action is effectively prevented by the clamping plates 84 and 85 and their connections with the tuckers 82 and 83 which cause the plates to move into contact with the package in advance of the corresponding movement of the tuckers and to maintain this contact until the tuckers have moved away from the package.

Figure 16:
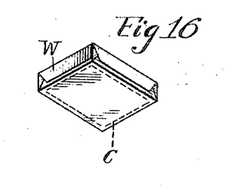

The elevator 80 next pushes the package upwardly into a stacker 90, the final fold being made during this movement of the package. Adhesive material is applied to the side flaps and the upper end flap at the proper points in the folding operations to secure the wrapper firmly on the package. Fig. 16 shows the package in its completed condition.

The wrapper feeding mechanism and the mechanisms that fold and glue the wrapper about the article are identical in all essential particulars, (except as to the plates 84 and 85 controlled by the tuckers 82 and 83) with the construction shown and described in detail in my application Serial No. 833,157 above mentioned. Accordingly any detailed description of these parts here is deemed unnecessary.

It is obvious that many changes may be made in the details of construction without departing from the essential features or characteristics of the present invention and accordingly I do not wish to be limited to the specific details of construction of the machine shown. Where cards, folders or other inserts of substantial thickness are used a different type of insert feeding mechanism may of course be employed without departing from the spirit or scope of this invention.

Having thus described my invention, what I claim as new and desire to secure by Letters Patent of the United States is:

1. In a wrapping machine, the combination with wrapping mechanism, of means for presenting packages to said mechanism comprising a conveyer having a series of pushers each operative to advance a package, a support for the packages over which they are moved by said conveyer, another support on which the packages drop from the first support out of the path of said pushers, and means for advancing the packages along said second support.

2. In a wrapping machine, the combination with wrapping mechanism, of means for presenting packages to said mechanism comprising a conveyer having a series of pushers each operative to advance a package, a support for the packages over which they are moved by said conveyer, another support on which the packages drop from the first support out of the path of said pushers, and a reciprocating plunger operative to advance the packages one at a time along said second support.

3. In a wrapping machine, the combination with wrapping mechanism, of a plunger reciprocating horizontally and operative to advance articles to be wrapped one at a time to said wrapping mechanism, a second plunger reciprocating horizontally at substantially right angles to the first plunger and operative to deliver said articles one at a time to the first plunger, and a conveyer arranged to deliver the articles to be wrapped to said second plunger.

4. In a wrapping machine, the combination with wrapping mechanism and means for presenting packages to said mechanism comprising a plunger having two plunger faces one in advance of and below the other, means for reciprocating said plunger, and means for delivering articles to be wrapped one at a time in front of the rear face of said plunger, said faces being so arranged with reference to the stroke of the plunger that the rear face is operative to move each article delivered to it to a point in advance of the rearward limit of movement of the front face, of means independent of said plunger for supporting each article in its forward position through lateral engagement therewith, said supporting means being operative to release the article while the forward plunger face is at the rearward part of its stroke to cause the article to be positioned by gravity in front of said forward plunger face.

5. In a wrapping machine, the combination with wrapping mechanism and means for presenting packages to said mechanism comprising a plunger having two plunger faces one in advance of and below the other, means for reciprocating said plunger, and means for delivering articles to be wrapped one at a time in front of the rear face of said plunger, said faces being so arranged with reference to the stroke of the plunger that the rear face is operative to move each article delivered to it to a point in advance of the rearward limit of movement of the front face, of means movable laterally toward and from the path of movement of said articles to sustain each article in its forward position and operative to release the article so sustained while the forward plunger face is at the rearward part of its stroke to cause the article to be positioned in front of said forward face.

6. In a wrapping machine, the combination with wrapping mechanism and means for presenting packages to said mechanism comprising a plunger having two plunger faces one in advance of and below the other, means for reciprocating said plunger, and means for delivering articles to be wrapped one at a time in front of the rear face of said plunger, said faces being so arranged with reference to the stroke of the plunger that the rear face is operative to move each article delivered to it to a point in advance of the rearward limit of movement of the front face, of a guideway along which each article is moved by said rear face, a presser device constructed and arranged to bear against the side of each article and press it against the side of the guideway to sustain the article in its forward position, and operating means for said presser device constructed and arranged to cause said device to release the article while the forward plunger face is at the rearward part of its stroke to permit the article to drop in front of said forward plunger face.

7. In a wrapping machine, the combination with wrapping mechanism and means for advancing articles to be wrapped one at a time to said mechanism, of a support along which said articles are moved by said advancing means, means for sustaining each article temporarily above said support, and means for delivering an insert on said support under each article while it is so sustained.

8. In a wrapping machine, the combination with wrapping mechanism and means for advancing articles to be wrapped one at a time to said mechanism, of a support along which said articles are moved by said advancing means, means for delivering inserts one at a time on to said support in front of said advancing means, and means for depositing an article to be wrapped on each insert so delivered, said advancing means being operative to deliver both the article and the insert to the wrapping mechanism.

9. In a wrapping machine, the combination with wrapping mechanism and means for advancing articles to be wrapped one at a time to said mechanism, of a support along which said articles are moved by said advancing means, means for delivering inserts one at a time on to said support in front of said advancing means, and means operative to carry an article on to said support in front of said advancing means through a different plane from that in which the insert is delivered to said support, said advancing means being constructed and arranged to deliver both the insert and the article to the wrapping mechanism.

10. In a wrapping machine, the combination with wrapping mechanism and means for advancing articles to be wrapped one at a time to said mechanism, of a support along which said articles are moved by said advancing means, means for delivering inserts one at a time on to said support in front of said advancing means, said support being grooved in the direction of travel of the advancing means and said advancing means having yielding fingers projecting into said grooves operative to engage each insert so delivered and advance it toward the wrapping mechanism, and means for delivering articles to be wrapped one at a time in front of said advancing means in position to be carried by said advancing means together with an insert into the wrapping mechanism.

11. In a wrapping machine, the combination with wrapping mechanism and means for advancing articles to be wrapped one at a time to said mechanism, of a magazine adapted to hold a stack of inserts, means for feeding inserts from said magazine one at a time, a guideway into which each insert is delivered by said feeding mechanism, said guideway leading to a point adjacent to the path of travel of said articles, a device movable to and fro through said guideway and operative to push the inserts one at a time therethrough, means for operating said device, and means for squaring up the inserts before they are pushed out of said guideway.

12. In a wrapping machine, the combination with wrapping mechanism and advancing means operative to advance articles to be wrapped one at a time to said mechanism, of a magazine adapted to hold a stack of inserts, a guideway leading from said magazine to the path of travel of said articles as they are advanced to the wrapping mechanism, a feeder operative to move inserts one at a time from said magazine into said guideway, a swinging pusher operative to force the inserts one at a time through said guideway and into said path of movement of the articles to be wrapped, and cam means for operating said pusher.

13. In a machine of the character described, the combination with means for folding a wrapper about an article and overlapping the edges of the wrapper on one face of the article, of a tucker arranged to operate on an extension of said overlapped parts, and means movable relatively to the article to clamp said edges against said face while the tucker operates on said extension.

14. In a machine of the character described, the combination with means for folding a wrapper about an article and overlapping the edges of the wrapper on opposite faces of the article, a pair of tuckers movable toward and from each other and over the opposite edges of the package to make tucks in said wrapper, means for operating said tuckers, and clamps movable into contact with said faces of the package in advance of said tuckers.

15. In a machine of the character described, the combination with wrapping mechanism comprising a folding chute and means for advancing a package through said chute to fold a wrapper about it in a "die fold" with opposite edges of the wrapper overlapped on each other along opposite faces of the package, and leaving a wrapper extension projecting beyond one end of the package, of a pair of tuckers movable toward and from each other to make end tucks in said wrapper extension, and clamps operative to hold said overlapping parts at the opposite sides of the package while the tuckers are operating on said wrapper.

16. In a machine of the character described, the combination with wrapping mechanism comprising a folding chute and means for advancing a package through said chute to fold a wrapper about it in a "die fold" with opposite edges of the wrapper overlapped on each other along opposite faces of the package, and leaving a wrapper extension projecting beyond one end of the package, of a pair of tuckers movable toward and from each other to make end tucks in said wrapper extension, clamps operative to hold said overlapping parts at the opposite sides of the package while the tuckers are operating on said wrapper, and connections between said clamps and tuckers whereby the clamps are operated by the tuckers.

17. In a machine of the character described, the combination with wrapping mechanism comprising a folding chute and means for advancing a package through said chute to fold a wrapper about it in a "die fold" with opposite edges of the wrapper overlapped on each other along opposite faces of the package, and leaving a wrapper extension projecting beyond one end of the package, of means for making end tucks in said extension at opposite edges of said package and means for clamping said overlapping parts while the tucks are being made.

In testimony whereof I have signed my name to this specification.

HARRY Y. ARMSTRONG.